(12) United States Patent
Agarwal et al.

(10) Patent No.: US 10,742,751 B2
(45) Date of Patent: Aug. 11, 2020

(54) USER BASED MDNS SERVICE DISCOVERY

(71) Applicant: Cisco Technology, Inc., San Jose, CA (US)

(72) Inventors: Saurabh Kumar Agarwal, San Jose, CA (US); Manoj Meena Narayan, Fremont, CA (US); Saiprasad Reddy Muchala, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 2 days.

(21) Appl. No.: 16/169,402

(22) Filed: Oct. 24, 2018

(65) Prior Publication Data
US 2020/0137173 A1 Apr. 30, 2020

(51) Int. Cl.
| | | |
|---|---|---|
| *H04L 29/08* | (2006.01) | |
| *H04L 29/12* | (2006.01) | |
| *H04W 84/12* | (2009.01) | |
| *H04L 12/66* | (2006.01) | |

(52) U.S. Cl.
CPC .......... *H04L 67/16* (2013.01); *H04L 61/1511* (2013.01); *H04L 61/1541* (2013.01); *H04L 61/6022* (2013.01); *H04L 12/66* (2013.01); *H04W 84/12* (2013.01)

(58) Field of Classification Search
CPC . H04L 67/16; H04L 61/1511; H04L 61/1541; H04L 61/6022; H04L 12/66; H04W 84/12
USPC ........................................................ 709/224
See application file for complete search history.

(56) References Cited

U.S. PATENT DOCUMENTS

| | | | |
|---|---|---|---|
| 6,574,668 B1 * | 6/2003 | Gubbi .................. | H04L 1/1614 709/231 |
| 8,180,891 B1 | 5/2012 | Harrison | |
| 2014/0010150 A1 | 1/2014 | Agarwal et al. | |
| 2014/0214958 A1 * | 7/2014 | Cheshire ............. | H04L 61/1511 709/204 |
| 2014/0313929 A1 * | 10/2014 | Qi ......................... | H04L 67/16 370/254 |

(Continued)

FOREIGN PATENT DOCUMENTS

EP 1690373 B1 * 1/2013 ............. H04L 67/26

OTHER PUBLICATIONS

S. Cheshire et al., "Multicast DNS", Internet Engineering Task Force (IETF), Feb. 2013, http://www.rfc-editor.org/info/rfc6762, 70 pages.

*Primary Examiner* — Zi Ye
(74) *Attorney, Agent, or Firm* — Edell, Shapiro, & Finnan, LLC (57) ABSTRACT

Techniques for user-based service discovery in a network are described. In one embodiment, a method includes receiving, at a controller, a query to discover advertised services from a user device from a local area network. The method includes determining one or more advertised services in response to the query from the user device and determining a service discovery gateway agent for the local area network in communication with the user device. A query response that includes the one or more advertised services determined in response to the query is transmitted to the service discovery gateway agent. The service discovery gateway agent is configured to receive the query response and transmit the one or more advertised services to the user device via a Layer 2 unicast transmission.

20 Claims, 8 Drawing Sheets

(56) References Cited

U.S. PATENT DOCUMENTS

| | | |
|---|---|---|
| 2015/0341446 A1 | 11/2015 | Nguyen et al. |
| 2016/0127305 A1* | 5/2016 | Droms ................ H04L 61/1511 709/223 |
| 2018/0131775 A1 | 5/2018 | Devarajan et al. |

* cited by examiner

USER BASED MDNS SERVICE DISCOVERY

TECHNICAL FIELD

This disclosure relates generally to a wide area multicast domain name system in zero-configuration networking.

BACKGROUND

Zero-configuration networking automatically creates a usable computer network between networked devices (e.g., computers, printers, peripherals, etc.) based on the Transmission Control Protocol and Internet Protocol (TCP/IP). Zero-configuration networking includes service discovery, address assignment and hostname resolution. The networked devices can be automatically connected using multicast Domain Name System (mDNS). Discovery of networked devices in a local area network can return a large number of results, especially in large scale networked environments.

DESCRIPTION OF EXAMPLE EMBODIMENTS

Overview

Presented herein are techniques for user-based service discovery in a network. In an example embodiment, a method includes receiving, at a controller, a query to discover advertised services from a user device from a local area network. The method includes determining one or more advertised services in response to the query from the user device. The method also includes determining a service discovery gateway agent for the local area network in communication with the user device. A query response that includes the one or more advertised services determined in response to the query is transmitted to the service discovery gateway agent. The service discovery gateway agent is configured to receive the query response and transmit the one or more advertised services to the user device via a Layer 2 unicast transmission.

EXAMPLE EMBODIMENTS

Zero-configuration networking automatically creates a usable computer network between networked devices (e.g., computers, printers, peripherals, etc.) based on the Transmission Control Protocol and Internet Protocol (TCP/IP). As zero-configuration networking becomes more prevalent, service discovery in a local area network returns increasingly larger numbers of possible results. Therefore, it would be helpful to users of zero-configuration networking devices to receive user-based results to limit the results to services which are more relevant to a particular user. For example, user-based service discovery may include returning only the services that are available near a user's location, services that are relevant to a user's particular needs, and/or services that the user is authorized to access.

Currently, conventional zero-configuration networking solutions provide a last mile service discovery response that is link local multicast based. As a result, location or specific user based filtering and discovery of services is not possible. Additionally, a number of other challenges exist with conventional zero-configuration networking solutions. For example, wide area zero-configuration networking discovery policy is typically configured on a central controller, which can be complex as it is tied to network configurations. Location information is also typically tied to network configurations, which are not granular enough to provide user-based experiences. Accordingly, an overwhelmingly large number of responses are provided to users, even when those users are not interested or looking for services.

The principles of the example embodiments described herein provide techniques for user-based and/or location-based service discovery for zero-configuration networking. Moreover, the techniques described in the example embodiments simplify network configurations needed to enable multicast Domain Name System (mDNS) service discovery in Layer 2 (L2)/Layer 3 (L3) networks.

Figure 1:
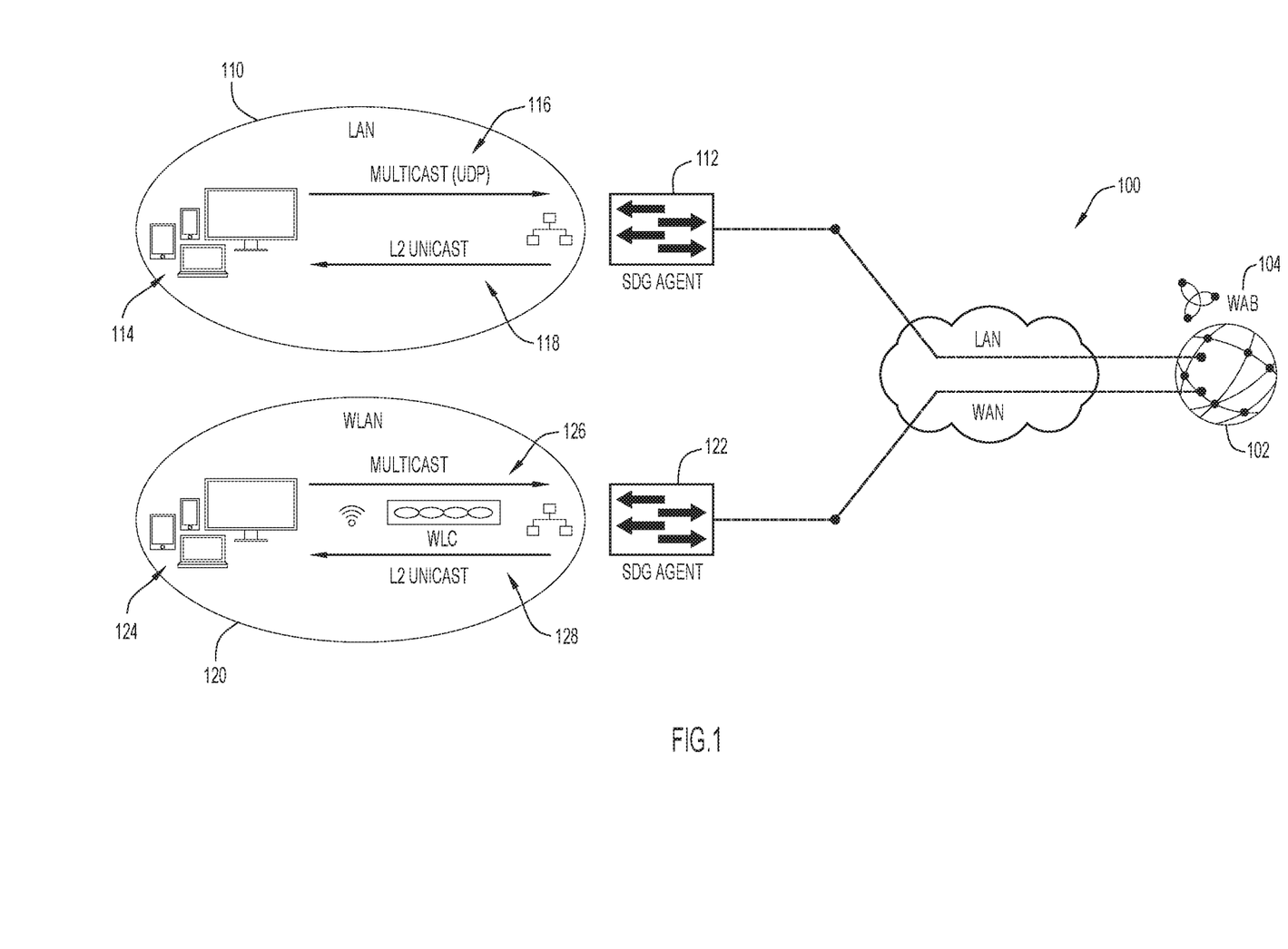
FIG. 1 is a diagram illustrating a network in which techniques for user-based service discovery may be implemented, according to an example embodiment.

Referring now to FIG. 1, a network 100 in which techniques for user-based service discovery may be implemented is shown according to an example embodiment. In some embodiments, network 100 may be a wide area network (WAN), such as the Internet, that enables communication between a plurality of networks, including, for example, a local area network 110 (LAN) and/or a wireless local area network 120 (WLAN). It should be understood that any number of networks may communicate over network 100, including, but not limited to any number of wired or wireless networks.

In an example embodiment, network 100 may include a controller 102. Controller 102 may be a network device embodied in hardware, software, or a combination of hardware and software that is configured to implement various monitoring, control, and management operations to one or more components of network 100, including local area network 110 and/or wireless local area network. Additionally, in one embodiment, controller 102 may implement zero-configuration networking in networks 100, 110, 120. For example, controller 102 may include a zero-configuration networking application 104 (e.g., wide-area Bonjour application (WAB)) that implements policies for the various devices within networks 100, 110, 120 to enable zero-configuration networking. In the example embodiments, zero-configuration networking may be described in reference to devices implementing Bonjour software to provide zero-configuration networking services. However, it should be understood that the principles of the embodiments described herein may also be applied to other zero-configuration technologies.

In this embodiment, each of local area networks 110, 120 may include a local area service discovery gateway (SDG) agent, including a first SDG agent 112 associated with local area network 110 and a second SDG agent 122 associated with wireless local area network 120. SDG agents (e.g., first SDG agent 112 and/or second SDG agent 122) may be access devices configured to provide communication access to a respective local area network (e.g., local area networks 110, 120). Additionally, each of local area networks 110, 120 includes one or more devices, including a first plurality of devices 114 associated with local area network 110 and a second plurality of devices 124 associated with wireless local area network 120. Plurality of devices 114, 124 may include servers, computing devices, printers, smart phones, networked components, televisions, endpoints, and/or other network elements.

In the example embodiments, networks 100, 110, 120 are configured to run zero-configuration services, including, but not limited to multicast Domain Name System (mDNS). mDNS protocol is defined by Internet Engineering Task Force (IETF) publication RFC 6762, the contents of which are incorporated herein by reference in their entirety.

In this embodiment, each SDG agent 112, 122 can communicate with controller 102 to request and/or receive zero-configuration service requests and results. For example, zero-configuration networking application 104 of controller 102 may be configured to receive zero-configuration service request queries to discover advertised services from one or more of plurality of devices 114, 124 and to generate a response that includes the advertised services that are available to the requesting device(s).

In some examples, an agent (e.g., first SDG agent 112 and/or second SDG agent 122) can send an advertisement to controller 102, advertising services the plurality of devices within the network the agent is connected to (e.g., first plurality of devices 114 associated with network 110 and/or second plurality of devices 124 associated with network 120) can provide to other networked devices within the network (e.g., printing, file sharing, screen sharing, audio/video, etc.) Once connected, agents 112, 122 and controller 102 can keep an active connection (e.g., maintain the state), for example, until an agent sends a withdraw messages or a heartbeat is not received at the server from the agent. While connected, the advertised devices can be available for connection by other networked device based on one or more policies. For example, controller 102 can execute one or more policies for enabling communication between plurality of devices 114, 124 of networks 110, 120 via agents 112, 122 as shown in FIG. 1. SDG agents 112, 122 may also be configured to run one or more policies (e.g., local area agent polices, wide area agent policies, etc.).

As shown in FIG. 1, when one or more devices of plurality of devices 114, 124 sends an mDNS query to request zero-configuration networking services, the query may be sent via multicast UDP to the relevant SDG agent 112, 122. For example, within local area network 110, one or more of first plurality of devices 114 may send a query to first SDG agent 112 via multicast UDP 116. Similarly, within wireless local area network 120, one or more of second plurality of devices 124 may send a query to second SDG agent 122 via multicast UDP 126. In conventional zero-configuration networks, the corresponding service discovery response would be provided via a link local multicast.

According to the principles of the example embodiments described herein, however, techniques for user-based and/or location-based service discovery for zero-configuration networking provide service discovery responses that are delivered via unicast so that only the relevant L2 media access control (MAC) addressed client that initiated the query receives the response. For example, as shown in FIG. 1, the corresponding service discovery response to the query sent by a device in local area network 110 via multicast UDP 116 is returned via L2 unicast 118. Similarly, the corresponding service discovery response to the query sent by a device in wireless local area network 120 via multicast UDP 126 is returned via L2 unicast 128. With this arrangement, user-based and/or location-based service discovery may be enabled within networks 110, 120.

Figure 2:
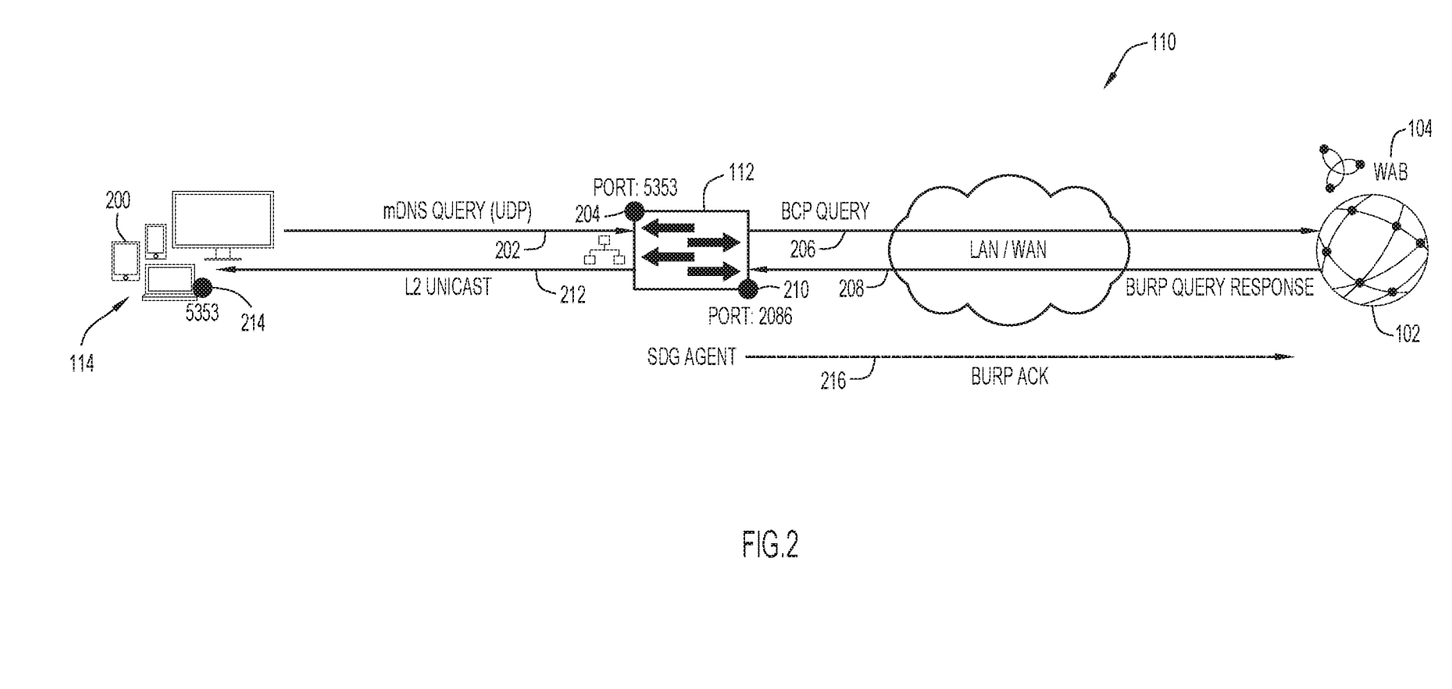
FIG. 2 is a diagram illustrating a procedure for user-based service discovery in a local area network, according to an example embodiment.

Further details of the techniques for user-based and/or location-based service discovery for zero-configuration networking according to the example embodiments will be described with reference to FIGS. 2-7 below. Referring now to FIG. 2, local area network 110 is illustrated, including first SDG agent 112 and plurality of devices 114. Additionally, as described above, local area network 110 may communicate with controller 102 and/or zero-configuration networking application 104 in network 100.

In this embodiment, a user device 200 of plurality of devices 114 may send an mDNS query 202 to discover one or more advertised services associated with zero-configuration networking. The query 202 is sent over multicast UDP to a corresponding multi cast port 204 (e.g., port 5353) of first SDG agent 112. Upon receiving query 202 for advertised services, first SDG agent 112 does not perform a lookup in its local cache for relevant services. Instead, first SDG agent 112 forwards query 202 to zero-configuration networking application 104 of controller 102 as a Bonjour Control Protocol (BCP) query 206 over TCP.

Upon receiving BCP query 206 from first SDG agent 112, zero-configuration networking application 104 matches various policies against information provided in query 206 to determine one or more advertised services that may be returned in response. Additionally, zero-configuration networking application 104 also may use information associated with the requesting device (e.g., user device 200) to determine the location and last mile SDG agent to which the response should be sent. That is, the "last mile" SDG agent refers to the particular SDG agent of the local area network that physically reaches the requesting user device. In this embodiment, the last mile SDG agent is first SDG agent 112, which is the same SDG agent that forwarded query 202 from user device 200. However, in other embodiments, the SDG agent that forwards query 202 as BCP query 206 to zero-configuration networking application 104 may be a different SDG agent than the last mile SDG agent for user device 200.

Upon determining the last mile SDG agent for the local area network in communication with the requesting user device (e.g., first SDG agent 112 for user device 200), zero-configuration networking application 104 transmits a query response 208 over UDP to the last mile SDG agent connected to the requesting user device. In an example embodiment, query response 208 is a packet that includes information associated with the one or more advertised services determined in response to the query from the user device and is formatted according to a Bonjour Unicast Response Protocol (BURP), which will be described in more detail with reference to FIGS. 5 and 6 below. As shown in FIG. 2, query response 208 is sent from zero-configuration networking application 104 to a port 210 (e.g., port 2086) of first SDG agent 112 that is connected to user device 200.

First SDG agent 112 receives query response 208 from zero-configuration networking application 104 and extracts the Layer 2 information (e.g., a MAC address) in the packet. Additionally, first SDG agent 112 may also perform a verification on the received query response 208. For example, first SDG agent 112 may verify that the query response 208 matches a hashing scheme (e.g., MD5) and passes other checks. Upon performing the verification, first SDG agent 112 may send an acknowledgement response 216 to the sender, in this case, zero-configuration networking application 104, to acknowledge successful transmission. In an example embodiment, acknowledgement response 216 is the form of a BURP ACK packet, which will be described in more detail with reference to FIG. 7 below. If, however, zero-configuration networking application 104 does not receive acknowledgement response 216, zero-configuration networking application 104 may re-send query response 216. In some cases, zero-configuration networking application 104 may attempt to re-send query response 216 a predetermined number of times.

Upon extracting the Layer 2 information from query response 208, first SDG agent 112 may then transmit the one or more advertised services that are available to the requesting user device (e.g., user device 200) via an L2 unicast 212 transmission to the device using the device's MAC address. In this embodiment, L2 unicast 212 packet is transmitted to user device 200, which includes the advertised services determined in response to the original query 202 from user device 200. User device 200 receives the L2 unicast 212 response on a port 214 (e.g., port 5353) and provides access to the requested advertised services to a user of user device 200. With this arrangement, first SDG agent 112 provides the L2 unicast 212 response only to user device 200 of plurality of devices 114.

Figure 3:
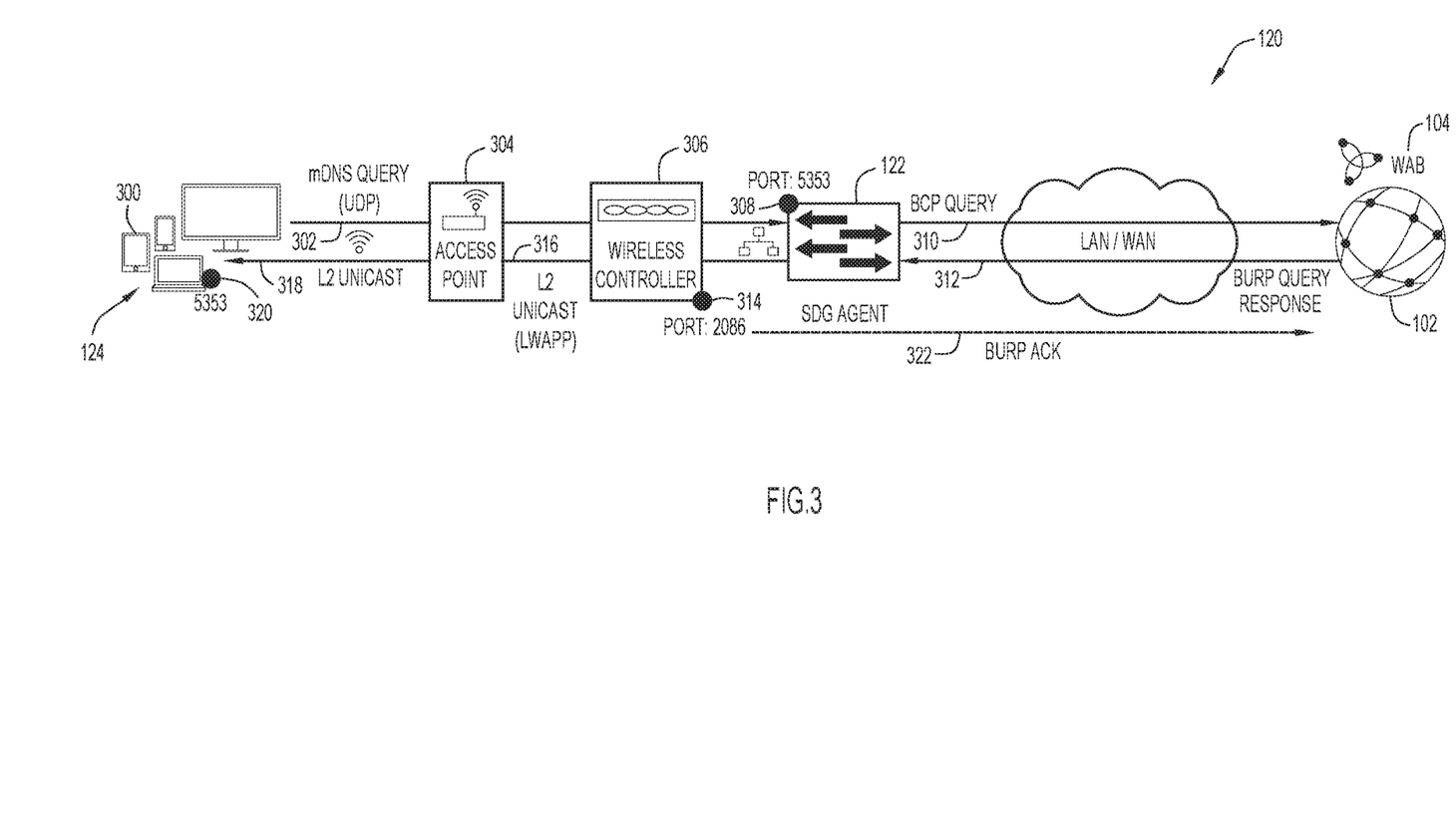
FIG. 3 is a diagram illustrating a procedure for user-based service discovery in a wireless local area network, according to an example embodiment.

Referring now to FIG. 3, wireless local area network 120 is illustrated; including second SDG agent 122 and plurality of devices 124, as well as an access point 304 and a wireless controller 306. Additionally, as described above, wireless local area network 120 may communicate with controller 102 and/or zero-configuration networking application 104 in network 100.

In this embodiment, a user device 300 of plurality of devices 124 may send an mDNS query 302 to discover one or more advertised services associated with zero-configuration networking. The query 302 is sent over multicast UDP to access point 304 and passes through to second SDG agent 122 via wireless controller 306. For example, wireless controller 306 may be configured to pass query 302 to second SDG agent using Control and Provisioning of Wireless Access Points (CAPWAP) protocol. In this embodiment, query 302 is received at a corresponding multicast port 308 (e.g., port 5353) of second SDG agent 122. Upon receiving query 302 for services, second SDG agent 122 does not perform a lookup in its local cache for relevant services. Instead, second SDG agent 122 forwards query 302 to zero-configuration networking application 104 of controller 102 as a BCP query 310 over TCP.

Upon receiving BCP query 310 from second SDG agent 122, zero-configuration networking application 104 matches various policies against information provided in query 310 to determine one or more advertised services that may be returned in response. Additionally, zero-configuration networking application 104 also may use information associated with the requesting device (e.g., user device 300) to determine the location and last mile SDG agent to which the response should be sent. In this embodiment, the last mile SDG agent is second SDG agent 122, which is the same SDG agent that forwarded query 302 from user device 300. However, in other embodiments, the SDG agent that forwards query 302 as BCP query 310 to zero-configuration networking application 104 may be a different SDG agent than the last mile SDG agent for user device 300.

In addition, in this embodiment, zero-configuration networking application 104 also may determine the wireless local controller for the access point to which the requesting user device (e.g., user device 300) is connected. For example, as shown in FIG. 3, zero-configuration networking application 104 may determine that wireless controller 306 is the wireless local controller for access point 304, which connects user device 300 to wireless local area network 120. Accordingly, zero-configuration networking application 104 transmits a query response 312 over UDP to a port 314 (e.g., port 2086) of wireless controller 306. In an example embodiment, query response 312 is a packet that includes information associated with the one or more advertised services determined in response to the query from the user device and is formatted as a BURP packet.

Wireless controller 306 receives query response 312 from zero-configuration networking application 104 and extracts the Layer 2 information (e.g., a MAC address) in the packet. Additionally, wireless controller 306 may also perform a verification on the received query response 312. For example, wireless controller 306 may verify that the query response 312 matches a hashing scheme (e.g., MD5) and passes other checks. Upon performing the verification, wireless controller 306 may send an acknowledgement response 322 to the sender, in this case, zero-configuration networking application 104, to acknowledge successful transmission. In an example embodiment, acknowledgement response 322 is the form of a BURP ACK packet. If, however, zero-configuration networking application 104 does not receive acknowledgement response 322, zero-configuration networking application 104 may re-send query response 312. In some cases, zero-configuration networking application 104 may attempt to re-send query response 312 a predetermined number of times.

Upon extracting the Layer 2 information from query response 312, wireless controller 306 may then transmit the response including the one or more advertised services that are available to the requesting user device (e.g., user device 300) and the extracted MAC address for the requesting user device to access point 304. In some embodiments, wireless controller 306 may send the response and MAC address to access point 304 via a CAPWAP tunnel.

Access point 304 receives the response and MAC address for the requesting user device (e.g., user device 300) and provides the response with the requested advertised via an L2 unicast 318 transmission to the device using the device's MAC address. In this embodiment, L2 unicast 318 packet is transmitted to user device 300, which includes the advertised services determined in response to the original query 302 from user device 300. User device 300 receives the L2 unicast 318 response on a port 320 (e.g., port 5353) and provides access to the requested advertised services to a user of user device 300. With this arrangement, access point 304 provides the L2 unicast 318 response only to user device 300 of plurality of devices 124.

In some embodiments, wireless controller 306 may perform some of the functions of second SDG agent 122, described above. For example, second SDG agent 122 may be implemented on the same hardware and/or software as wireless controller 306. Accordingly, operations performed by second SDG agent 122 and/or wireless controller 306 may be performed by the same device. In other embodiments, each of second SDG agent 122 and wireless controller 306 may be implemented in separate devices.

Figure 4:
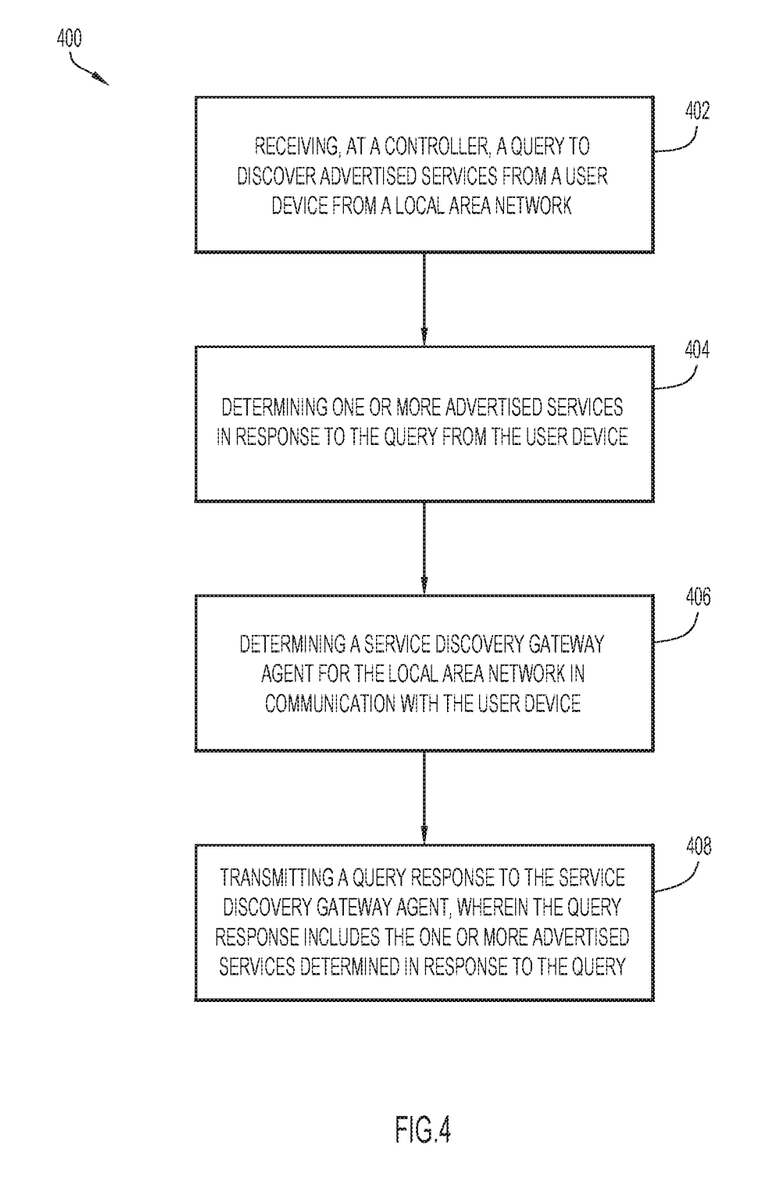
FIG. 4 is a flowchart illustrating a method of user-based service discovery, according to an example embodiment.

FIG. 4 is a flowchart of a method 400 for implementing techniques for user-based and/or location-based service discovery for zero-configuration networking in network 100, according to an example embodiment. In this embodiment, method 400 may be implemented by one or more SDG agents in a network, for example, first SDG agent 112 and/or second SDG agent 122, described above.

In this embodiment, method 400 may begin at an operation 402 where a controller receives a query to discover advertised services associated with zero-configuration networking from a user device of a local area network. For example, controller 102 of network 100 may receive a query from user device 200 of local area network 110, as shown in FIG. 2.

Next, at an operation 404, method 400 includes determining one or more advertised services associated with zero-configuration networking that are available to the requesting user device in response to the query. For example, zero-configuration networking application 104 of controller 102 may determine the available services based on one or more policies. An operation 406 includes determining a service discovery gateway (SDG) agent for the local area network in communication with the user device. For example, as shown in FIG. 2, first SDG agent 112 is the SDG agent for local area network 110 in communication with requesting user device 200. In some embodiments, for example, the embodiment described with reference to FIG. 3, operation 406 may also include determining a wireless local controller for the access point to which the requesting user device is connected. For example, as shown in FIG. 3, zero-configuration networking application 104 of controller 102 may determine that wireless controller 306 is the wireless local controller for access point 304, which connects user device 300 to wireless local area network 120.

Next, method 400 includes an operation 408 that includes transmitting a query response to the SDG agent determined at operation 406. The query response transmitted at operation 408 includes the one or more advertised services that were determined to be available to the requesting user device in response to the initial query, as determined at operation 404. Additionally, the SDG agent is configured to receive the query response and transmit the one or more advertised services to the user device via a Layer 2 unicast transmission, for example, as described above. With this arrangement, method 400 is configured to provide user-based and/or location-based service discovery for zero-configuration networking in a network.

Figure 5:
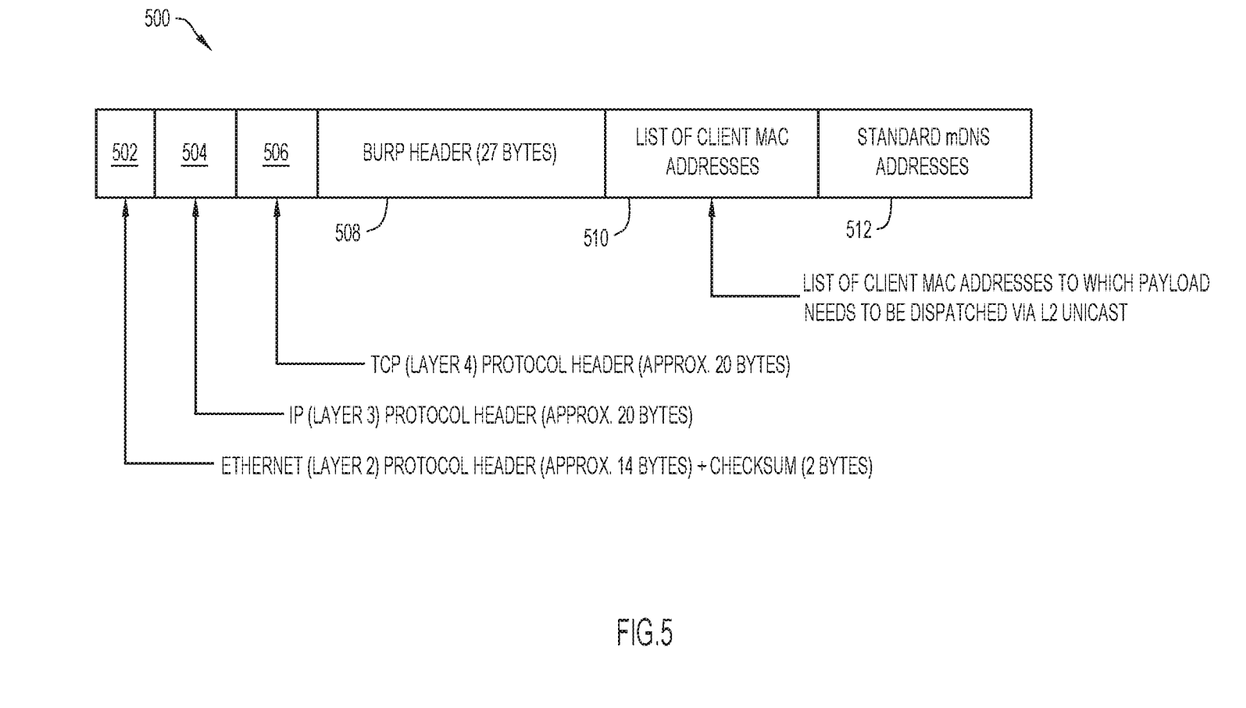
FIG. 5 is an example of a Bonjour Unicast Response Protocol packet for implementing techniques for user-based service discovery, according to an example embodiment.
Figure 6:
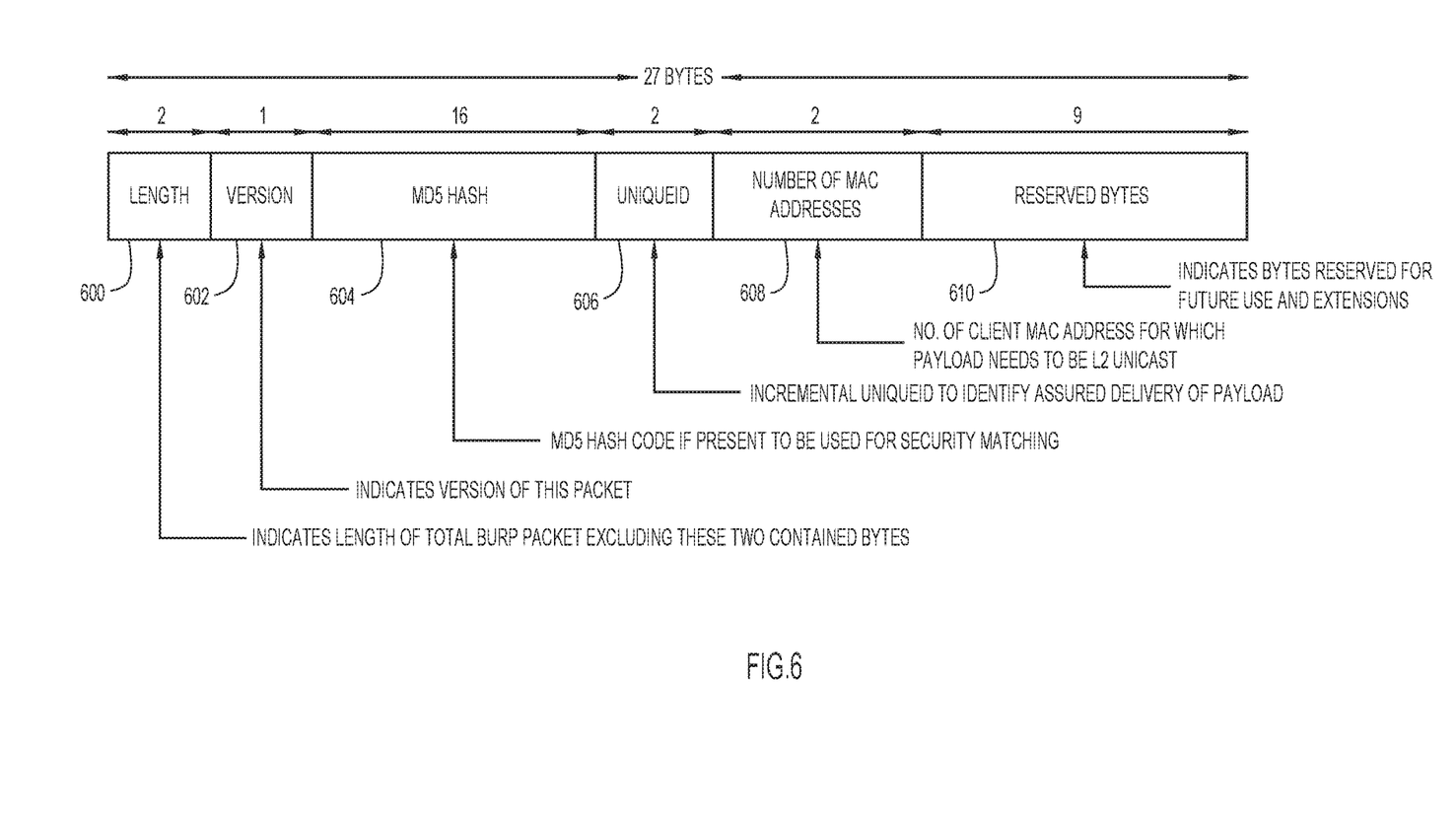
FIG. 6 is a Bonjour Unicast Response Protocol packet header, which is used for implementing techniques for user-based service discovery presented herein, according to an example embodiment.
Figure 7:
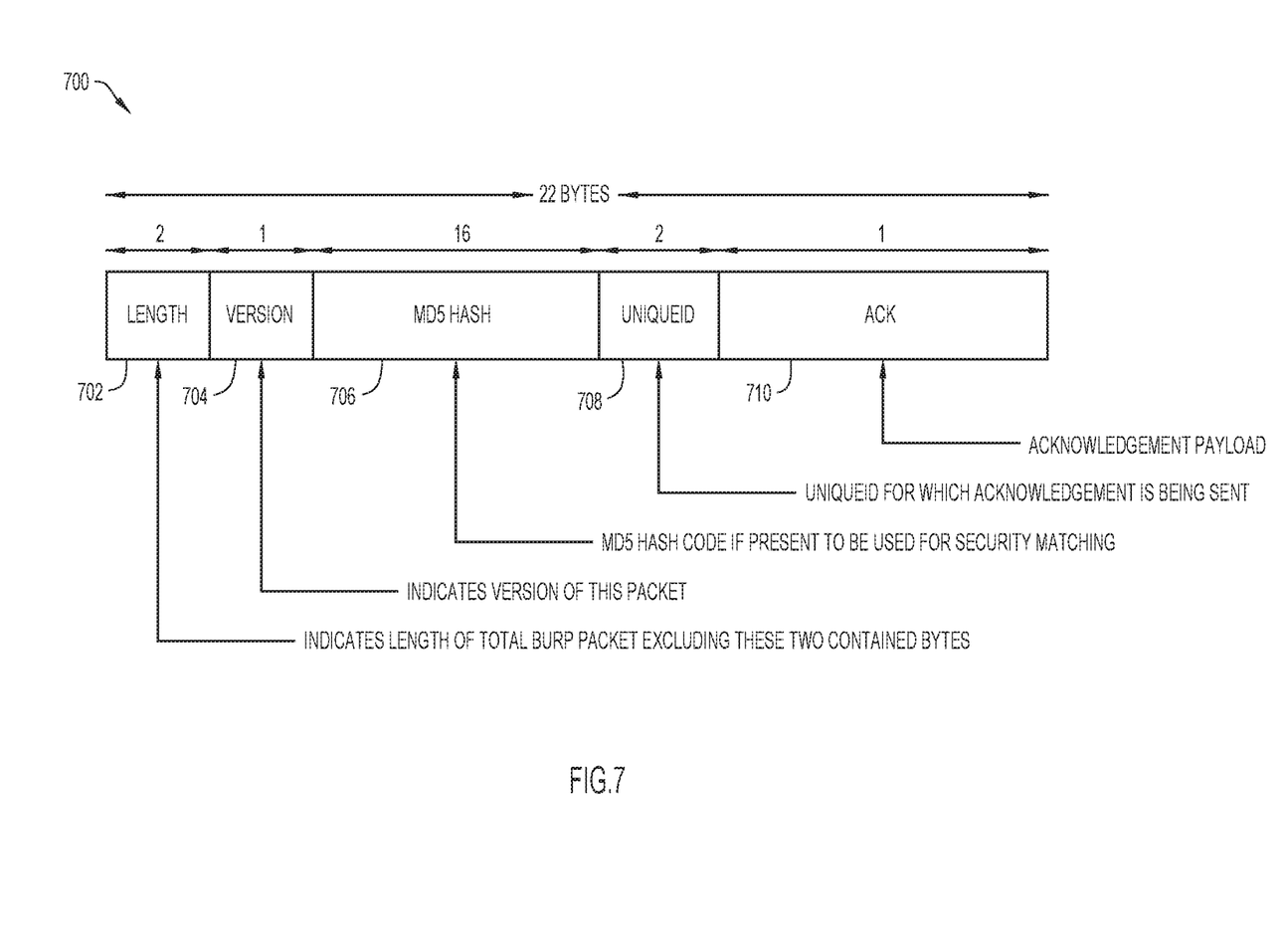
FIG. 7 is an example of a Bonjour Unicast Response Protocol acknowledgement (ACK) packet for implementing techniques for user-based service discovery, according to an example embodiment.

Referring now to FIGS. 5-7, examples of BURP packets and BURP ACK packets are illustrated that may be used by devices for implementing the techniques for user-based and/or location-based service discovery for zero-configuration networking according to the principles of the example embodiments described herein.

FIG. 5 illustrates an example packet structure of a Bonjour Unicast Response Protocol (BURP) packet 500 for implementing techniques for user-based service discovery, according to an example embodiment. In example embodiments, BURP packet 500 may be used by controller 102 and/or zero-configuration networking application 104 to transmit a response to a received BCP query packet to provide the requested advertised services. For example, BURP packet 500 may be provided in response to BCP query 206 and/or BCP query 310, as shown in reference to FIGS. 2 and 3 above.

In this embodiment, BURP packet 500 may include multiple headers, including an Ethernet (Layer 2) Protocol header 502, an IP (Layer 3) Protocol header 504, and a TCP (Layer 4) Protocol header 506. Ethernet Protocol header 502 is approximately 14 bytes and may include a checksum portion that is 2 bytes. IP Protocol header 504 is approximately 20 bytes and TCP Protocol header 506 is also approximately 20 bytes. Each of Ethernet Protocol header 502, IP Protocol header 504, and TCP Protocol header 506 may include information typically associated with a packet to be sent over a network. In accordance with the principles of the example embodiments described herein, BURP packet 500 further includes a BURP header 508. BURP header 508 is approximately 27 bytes and includes information for implementing the techniques for user-based and/or location-based service discovery for zero-configuration networking described herein. The structure and contents of BURP header 508 will be explained in more detail in reference to FIG. 6 below.

BURP packet 500 also includes a MAC address portion 510 and an mDNS payload portion 512. In this embodiment, MAC address portion 510 includes a list of the MAC addresses of user devices or clients to which the payload 512 (i.e., the requested advertised services in response to the BCP query) needs to be transmitted via the L2 unicast message by the relevant SDG agent. For example, as described above in connection with FIGS. 2 and 3, MAC address portion 510 contains the relevant Layer 2 information (e.g., MAC addresses) in BURP packet 500 that is extracted by the SDG agent receiving the query response from controller 102. The extracted MAC addresses may then be used by the SDG agent to transmit the L2 unicast message to the requesting user device.

Additionally, mDNS payload portion 512 includes the one or more advertised services that have been determined by zero-configuration networking application 104 of controller 102 to be available to the requesting client device. For example, the requested advertised services in mDNS payload portion 512 are provided in response to the BCP query and may be determined in accordance with operation 404 of method 400, described above.

FIG. 6 illustrates details of BURP packet header 508 of BURP packet 500, which is used for implementing techniques for user-based service discovery presented herein, according to an example embodiment. In this embodiment, BURP packet header 508 includes a length portion 600 that is 2 bytes and that indicates the total length of the BURP packet (e.g., BURP packet 500), excluding the 2 bytes used for length portion 600. BURP packet header 508 also includes a version portion 602 that uses 1 byte and indicates the version of the BURP packet. In addition, BURP packet header 508 may also include a hash portion 604 that is 16 bytes. Hash portion 604 includes a hash code for a hashing scheme that may be used for security matching. For example, in this embodiment, hash portion 604 includes an MD5 hash code, which may be used for verification purposes, as described above in reference to FIGS. 2 and 3.

In this embodiment, BURP packet header 508 further includes an identifier portion 606 that is 2 bytes. Identifier portion 606 includes an incremental unique identifier (UniqueID) that is used to identify assured delivery of the payload of BURP packet 500 (e.g., mDNS payload portion 512). BURP packet header 508 also includes a number portion 608 that is 2 bytes and that identifies the number of user device or client MAC addresses for which the payload of BURP packet 500 (e.g., mDNS payload portion 512) needs to be transmitted via L2 unicast by the receiving SDG agent. Additionally, BURP packet header 508 may also include a reserved portion 610 that is 9 bytes. Reserved portion 610 of BURP packet header 508 may indicate bytes that are reserved for future use and/or extensions.

FIG. 7 illustrates an example of a BURP acknowledgement (ACK) packet 700 for implementing techniques for user-based service discovery, according to an example embodiment. In an example embodiment, BURP ACK packet 700 may be transmitted by an SDG agent in response to receiving the query response (e.g., BURP packet 500) from controller 102 and/or zero-configuration networking application 104 to confirm receipt of the response. For example, as shown in FIGS. 2 and 3 above, acknowledgement response 216 sent by first SDG agent 112 and/or acknowledgement response 322 sent by second SDG agent 122 may have the form of BURP ACK packet 700.

In this embodiment, BURP ACK packet 700 is 22 bytes and includes a length portion 702 that is 2 bytes and that indicates the total length of the packet, excluding the 2 bytes used for length portion 702. BURP ACK packet 700 also includes a version portion 704 that uses 1 byte and indicates the version of the packet. In addition, BURP ACK packet may also include a hash portion 706 that is 16 bytes. Hash portion 706 includes a hash code for a hashing scheme that may be used for security matching, such as an MD5 hash code, which may be used for verification purposes, as described above in reference to FIGS. 2 and 3.

BURP ACK packet 700 also includes an identifier portion 708 that is 2 bytes. Identifier portion 708 includes the same unique identifier (UniqueID) that was used to identify the BURP packet 500 for which BURP ACK packet 700 is being sent to confirm delivery. BURP ACK packet 700 further includes an acknowledgement payload 710 that is 1 byte and contains the acknowledgement (ACK) of receipt of the corresponding BURP packet.

Figure 8:
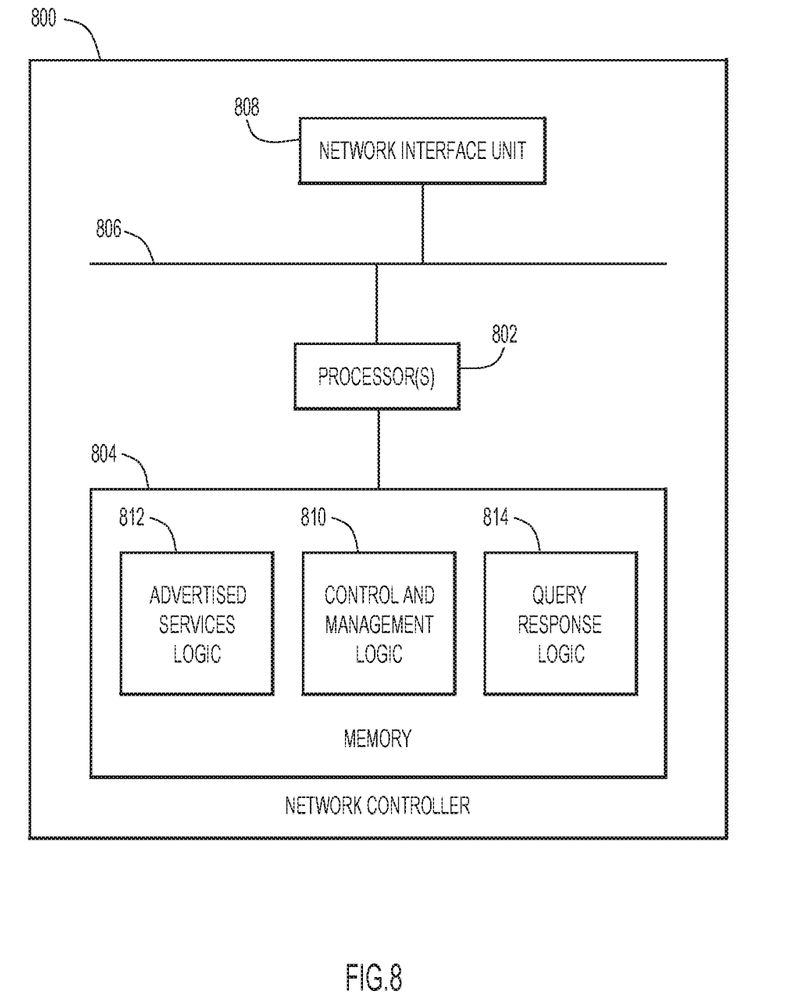
FIG. 8 is a block diagram of a controller for implementing techniques for user-based service discovery in a network, according to an example embodiment.

Reference is now made to FIG. 8. FIG. 8 illustrates a block diagram of a controller entity 800 that may perform the functions of controller 102 shown in FIGS. 1-3. Additionally, controller entity 800 may also include operations performed by zero-configuration networking application 104. The controller entity 800 includes one or more processors 802, memory 804, a bus 806, and a network interface unit 808, such as one or more network interface cards that enable network connectivity. The memory 804 stores instructions for control and management logic 810, that when executed by the processor 802, cause processor 802 to perform the software defined network controller operations described herein.

Additionally, memory 804 may further store instructions for advertised services logic 812 and query response logic 814. Advertised services logic 812, when executed by processor 802, causes processor 802 to perform one or more operations associated with determining one or more advertised services associated with zero-configuration networking that may be available to a requesting client device (e.g., in response to a query from client device 200, 300, described above), including, for example, functions associated with operation 404 of method 400. Query response logic 814, when executed by processor 802, causes processor 802 to perform one or more operations associated with preparing and transmitting a query response (e.g., BURP packet 500), including, for example, functions associated with operations 406, 408 of method 400.

The memory 804 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 804 may comprise one or more tangible (non-transitory) computer readable storage media (e.g., a memory device) encoded with software comprising computer executable instructions and when the software is executed (by the processor 802) it is operable to perform the controller operations described herein.

The principles of the example embodiments described herein provide techniques for user-based and/or location-based service discovery for zero-configuration networking. With these techniques, location and user-based policy enforcement may be achieved. For example, policies implemented by a controller for service discovery can be simplified, such as, "floor 1 area printers accessible to user 1 and user 2 only."

In addition, according to the techniques presented herein, responses to service discovery are received by last mile access devices, which transmit the response to end user devices/clients via L2 unicast, thereby adding value to access networking equipment. These techniques also reduce performance and load on SDG agents.

In summary, a method is provided comprising: receiving, at a controller, a query to discover advertised services from a user device from a local area network; determining one or more advertised services in response to the query from the user device; determining a service discovery gateway agent for the local area network in communication with the user device; and transmitting a query response to the service discovery gateway agent, wherein the query response includes the one or more advertised services determined in response to the query; wherein the service discovery gateway agent is configured to receive the query response and transmit the one or more advertised services to the user device via a Layer 2 unicast transmission.

In another form, a non-transitory computer readable storage media encoded with instructions that, when executed by a processor of a controller, cause the processor to: receive a query to discover advertised services from a user device from a local area network; determine one or more advertised services in response to the query from the user device; determine a service discovery gateway agent for the local area network in communication with the user device; and transmit a query response to the service discovery gateway agent, wherein the query response includes the one or more advertised services determined in response to the query; wherein the service discovery gateway agent is configured to receive the query response and transmit the one or more advertised services to the user device via a Layer 2 unicast transmission.

Furthermore, an apparatus is provided comprising: a plurality of network ports configured to receive inbound packets and to send outbound packets; a memory; a processor coupled to the memory and to the plurality of network ports, wherein the processor is configured to: receive a query to discover advertised services from a user device from a local area network; determine one or more advertised services in response to the query from the user device; determine a service discovery gateway agent for the local area network in communication with the user device; and transmit a query response to the service discovery gateway agent, wherein the query response includes the one or more advertised services determined in response to the query; wherein the service discovery gateway agent is configured to receive the query response and transmit the one or more advertised services to the user device via a Layer 2 unicast transmission.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving, at a controller, a query to discover advertised services from a user device via a service discovery gateway agent from a local area network of a plurality of local area networks with which the controller is associated, wherein the controller implements zero-configuration networking in the plurality of local area networks;
determining, by the controller, one or more advertised services in response to the query from the user device, wherein the one or more advertised services are determined by matching various policies against information provided in the query;
determining, by the controller, the service discovery gateway agent for the local area network to which the user device is a member; and
transmitting a query response from the controller to the service discovery gateway agent, wherein the query response includes the one or more advertised services determined in response to the query;
wherein the service discovery gateway agent is configured to receive the query response and transmit the one or more advertised services to the user device via a Layer 2 unicast transmission.

2. The method of claim 1, wherein the service discovery gateway agent is configured to extract a media access control (MAC) address for the user device from the query response.

3. The method of claim 1,
wherein the query response is transmitted by the service discovery gateway agent to only the user device that initiated the query to discover advertised services.

4. The method of claim 1, further comprising:
receiving, at the controller, an acknowledgement message to confirm that the user device received the query response.

5. The method of claim 1, further comprising:
upon determining, by the controller, that an acknowledgement message has not been received in response to the query response, resending the query response to the service discovery gateway agent.

6. The method of claim 5, wherein the controller is configured to attempt to resend the query response to the service discovery gateway agent a predetermined number of times.

7. The method of claim 1, wherein the local area network is a wireless local area network, the method further comprising:
determining, by the controller, a wireless local controller in communication with the service discovery gateway agent for the user device; and
transmitting the query response to the wireless local controller.

8. One or more non-transitory computer readable storage media encoded with instructions that, when executed by a processor of a controller, cause the processor to:
receive, at a controller, a query to discover advertised services from a user device via a service discovery gateway agent from a local area network of a plurality of local area networks with which the controller is associated, wherein the controller implements zero-configuration networking in the plurality of local area networks;
determine, by the controller, one or more advertised services in response to the query from the user device, wherein the one or more advertised services are determined by matching various policies against information provided in the query;
determine, by the controller, the service discovery gateway agent for the local area network to which the user device is a member; and
transmit a query response from the controller to the service discovery gateway agent, wherein the query response includes the one or more advertised services determined in response to the query;
wherein the service discovery gateway agent is configured to receive the query response and transmit the one or more advertised services to the user device via a Layer 2 unicast transmission.

9. The one or more non-transitory computer readable storage media of claim 8, wherein the service discovery gateway agent is configured to extract a media access control (MAC) address for the user device from the query response.

10. The one or more non-transitory computer readable storage media of claim 8,
wherein the query response is transmitted by the service discovery gateway agent to only the user device that initiated the query to discover advertised services.

11. The one or more non-transitory computer readable storage media of claim 8, wherein the instructions further cause the processor to:
receive an acknowledgement message to confirm that the user device received the query response.

12. The one or more non-transitory computer readable storage media of claim 8, wherein the instructions further cause the processor to:
upon determining that an acknowledgement message has not been received in response to the query response, resend the query response to the service discovery gateway agent.

13. The one or more non-transitory computer readable storage media of claim 12, wherein the instructions further cause the processor to:
attempt to resend the query response to the service discovery gateway agent a predetermined number of times.

14. The one or more non-transitory computer readable storage media of claim 8, wherein the local area network is a wireless local area network, and wherein the instructions further cause the processor to:
determine a wireless local controller in communication with the service discovery gateway agent for the user device; and
transmit the query response to the wireless local controller.

15. An apparatus comprising:
a plurality of network ports configured to receive unbound packets and to send outbound packets;
a memory;
a processor coupled to the memory and to the plurality of network ports, wherein the processor is configured to:
receive, at the apparatus a query to discover advertised services from a user device via a service discovery gateway agent from a local area network of a plurality of local area networks with which the controller is associated, wherein the controller implements zero-configuration networking in the plurality of local area networks;

determine, by the apparatus, one or more advertised services in response to the query from the user device, wherein the one or more advertised services are determined by matching various policies against information provided in the query;

determine, by the apparatus, the service discovery gateway agent for the local area network to which the user device is a member; and transmit a query response from the apparatus to the service discovery gateway agent, wherein the query response includes the one or more advertised services determined in response to the query;

wherein the service discovery gateway agent is configured to receive the query response and transmit the one or more advertised services to the user device via a Layer 2 unicast transmission.

16. The apparatus of claim 15, wherein the service discovery gateway agent is configured to extract a media access control (MAC) address for the user device from the query response.

17. The apparatus of claim 15, wherein the query response is transmitted by the service discovery gateway agent to only the user device that initiated the query to discover advertised services.

18. The apparatus of claim 15, wherein the processor is further configured to:

receive an acknowledgement message to confirm that the user device received the query response.

19. The apparatus of claim 15, wherein the processor is further configured to:

upon determining that an acknowledgement message has not been received in response to the query response, resend the query response to the service discovery gateway agent.

20. The apparatus of claim 15, wherein the local area network is a wireless local area network, and wherein the processor is further configured to:

determine a wireless local controller in communication with the service discovery gateway agent for the user device; and transmit the query response to the wireless local controller.

* * * * *

UNITED STATES PATENT AND TRADEMARK OFFICE
CERTIFICATE OF CORRECTION

PATENT NO. : 10,742,751 B2
APPLICATION NO. : 16/169402
DATED : August 11, 2020
INVENTOR(S) : Saurabh Kumar Agarwal et al.

Page 1 of 1

It is certified that error appears in the above-identified patent and that said Letters Patent is hereby corrected as shown below:

In the Claims

Claim 15, Column 12, Line 59, please replace "to receive unbound" with --to receive inbound--

Signed and Sealed this
First Day of December, 2020

Andrei Iancu
*Director of the United States Patent and Trademark Office*